(12) United States Patent
Yamada

(10) Patent No.: US 7,823,483 B2
(45) Date of Patent: Nov. 2, 2010

(54) WORKING DEPTH ADJUSTING DEVICES FOR ROTARY TOOLS

(75) Inventor: Yukihiko Yamada, Anjo (JP)

(73) Assignee: Makita Corporation, Anjo-shi (JP)

( * ) Notice: Subject to any disclaimer, the term of this patent is extended or adjusted under 35 U.S.C. 154(b) by 408 days.

(21) Appl. No.: 11/802,734

(22) Filed: May 24, 2007

(65) Prior Publication Data

US 2007/0283792 A1  Dec. 13, 2007

(30) Foreign Application Priority Data

Jun. 7, 2006  (JP) .............................. 2006-158289

(51) Int. Cl.
*B25B 13/00* (2006.01)
*B25B 21/00* (2006.01)

(52) U.S. Cl. ............................................ 81/54; 81/429
(58) Field of Classification Search ...................... 81/54, 81/429
See application file for complete search history.

(56) References Cited

U.S. PATENT DOCUMENTS

| | | | | |
|---|---|---|---|---|
| 2,940,488 | A * | 6/1960 | Riley, Jr. ........................ | 81/429 |
| 3,454,059 | A * | 7/1969 | Sindelar ........................ | 81/429 |
| 4,647,260 | A * | 3/1987 | O'Hara et al. ............ | 408/241 S |
| 5,601,387 | A * | 2/1997 | Sanford et al. ............... | 408/113 |
| 6,499,381 | B2 * | 12/2002 | Ladish et al. .................. | 81/429 |
| 6,758,116 | B2 * | 7/2004 | Kriaski et al. ................... | 81/54 |
| 6,912,932 | B2 * | 7/2005 | Kriaski et al. ................... | 81/54 |
| 7,337,697 | B2 * | 3/2008 | Bader et al. ...................... | 81/54 |
| 2003/0000347 | A1 | 1/2003 | Kriaski et al. | |
| 2007/0163397 | A1 | 7/2007 | Bader et al. | |

FOREIGN PATENT DOCUMENTS

| EP | 0 747 177 A1 | 12/1996 |
|---|---|---|
| EP | 1 655 105 A1 | 5/2006 |
| EP | 1 782 924 A1 | 5/2007 |
| JP | Y2 2510156 | 6/1996 |

* cited by examiner

*Primary Examiner*—David B Thomas
(74) *Attorney, Agent, or Firm*—Oliff & Berridge, PLC

(57) ABSTRACT

A working depth adjusting device includes an adjusting member, an intermediate member and an operation member. The adjusting member is supported on the front portion of the tool body and movable along the axis of the spindle, so that the position of the adjusting member can be adjusted relative to the tool bit with respect to a working depth direction. The intermediate member is rotatably supported on the adjusting member. The adjusting member moves in the working depth direction as the inmate member rotates. The operation member is operable to rotate relative to the intermediate member between a lock position and an unlock position. The intermediate member has a first engaging member. When the operation member is rotated to the lock position, the first engaging member engages the tool body, and the engagement of the first engaging member is maintained by the operation member, so that the working depth adjusting device can be prevented from being removed from the tool body. When the operation member is rotated to the unlock position, the first engaging member is disengaged from the tool body, so that the working depth adjusting device can be removed from the tool body.

22 Claims, 8 Drawing Sheets

WORKING DEPTH ADJUSTING DEVICES FOR ROTARY TOOLS

This application claims priority to Japanese patent application serial number 2006-158289, the contents of which are incorporated herein by reference.

BACKGROUND OF THE INVENTION

1. Field of the Invention

The present invention relates to working depth adjusting devices that are mounted to rotary tools, such as screwdrivers and drills, in order to adjust a working depth e.g., a driving depth of screws and a depth of drilled holes.

2. Description of the Related Art

In general, a driving depth adjusting device is mounted to a front portion of a screwdriver and is operable to adjust a driving depth of screws into a workpiece. A driver bit is mounted within the adjusting device and extends forwardly from the adjusting device. Therefore, in order to change a driver bit to another driver bit, it is necessary to remove the adjusting device from the screwdriver.

Japanese Utility Model Registration No. 2510156 and U.S. Pat. No. 6,758,116 teach driving depth adjusting devices that can be removed from a tool body of a screwdriver.

According to Japanese Utility Model Registration No. 2510156, a driving depth adjusting device includes an operation sleeve operable for adjusting a driving depth. The operation sleeve is attached to the front portion of a tool body of a screwdriver by means of a threaded portion provided on the operation sleeve and a corresponding thread portion provided on the front portion of the tool body. Rotating the operation sleeve changes the distance between the operation sleeve and the front portion of the tool body, so that an extending distance of a driver bit from the operation sleeve can be changed in order to adjust the driving depth. In addition, the operation sleeve can be removed from the tool body by rotating the operation sleeve in order to completely disengage the threaded portion of the operation sleeve from the thread portion of the tool body.

According to U.S. Pat. No. 6,758,116, a driving depth adjusting device has resilient hinges with engaging tabs that can engage a tool body. In order to remove the adjusting device from the tool body, the resilient hinges can be deformed to disengage the engaging tabs from the tool body.

However, in order to remove the adjusting device of Japanese Utility Model Registration No. 2510156, it is necessary to rotate the operation sleeve by several times for disengaging the threaded portions from each other. Therefore, the removing and mounting operations take much time and there has been a problem that the operability is not good. In addition, because the removing operation is troublesome, an operation for loosening screws cannot be rapidly performed. Thus, it is necessary to remove the adjusting device in order to perform the screw loosening operation.

In case of the arrangement of U.S. Pat. No. 6,758,116, there is a backlash between the adjusting device and the tool body within a range of resilient deformation of the resilient hinges. Therefore, it is difficult to reliably hold the adjusting device against the tool body.

Thus, there is a need in the art for a working depth adjusting device that can be easily mounted to and removed from a tool body and can be reliably held against the tool body.

SUMMARY OF THE INVENTION

One aspect according to the present invention includes working depth adjusting devices for a rotary tool that has a tool body and a spindle rotatable about an axis. A tool bit is attached to the spindle so as to be rotatably driven. The rotating tool bit can be pressed against a workpiece for processing the workpiece. The working depth adjusting device includes an adjusting member, an intermediate member and an operation member. The adjusting member can be attached to the front portion of the tool body and can move along the axis of the spindle, so that the position of the adjusting member can be adjusted relative to the tool bit with respect to a working depth direction. The intermediate member is rotatably mounted to the adjusting member. The adjusting member moves in the working depth direction as the intermediate member rotates. The operation member is operable to rotate relative to the intermediate member between a lock position and an unlock position. The intermediate member has a first engaging member. When the operation member is rotated to the lock position, the first engaging member engages the tool body, and the engagement of the first engaging member is maintained by the operation member, so that the working depth adjusting device can be prevented from being removed from the tool body. When the operation member is rotated to the unlock position, the first engaging member is disengaged from the tool body, so that the working depth adjusting device can be removed from the tool body.

Because the working depth adjusting device can be mounted by engaging the first engaging member of the intermediate member with the tool body and can be removed by disengaging the first engaging member from the tool body, it is no longer necessary to rotate the operation member by several times as required in the conventional device using the thread engaging construction. It is only necessary for rotating the operation member between the lock position and the unlock position. Therefore, the mounting and removing operation can be easily performed.

In addition, because the working depth adjusting device can be easily and rapidly mounted and removed, it is possible to effectively perform the operation of the rotary tool. For example, in the case that the rotary tool is a power screwdriver, the operation for loosening screws can be effectively performed.

Further, because the working depth adjusting device can be mounted to the tool body through engagement of the engaging member with the tool body and the engaging member is locked in the engaging position by the operation member, the working depth adjusting device can be firmly mounted without permitting substantial movement of the device as in the conventional construction that utilizes resiliently engaging tabs.

In one embodiment, the first engaging member is engageable with the tool body in a diametrical direction. The intermediate member finder includes a second engaging member engageable with and disengageable from the operation member in response to movement in a rotational direction of the operation member. When the operation member is rotated to the lock position, the second engaging member is disengaged from the operation member to permit rotation of the operation member relative to the intermediate member, and the first engaging member engages the tool body, and the engagement of the first engaging member is locked by the operation member. When the operation member is rotated to the unlock position, the operation member and the intermediate member am brought to rotate together by the second engaging member, and the first engaging member can be disengaged from the tool body to permit rotation and the movement in a removing direction of the intermediate member relative to the tool body.

With this arrangement, when the operation member is in the lock position, the second engaging member is disengaged from the operation member, while the first engaging member engages the tool body. When the operation member is in the unlock position, the intermediate member is integrated with the operation member with respect to rotation, so that the intermediate member rotates with the operation member as the operation member is rotated. As the intermediate member rotates, the adjusting member moves along the working depth direction, so that the working depth of the tool bit into the workpiece can be adjusted.

In another embodiment, the first engaging member is a ball. The tool body has an engaging recess for engaging the ball. When the operation member is rotated to the lock position, the ball engages the engaging recess of the tool body and is held in position. When the operation member is rotated to the unlock position, the ball is permitted to be removed from the engaging recess.

With this arrangement, the working depth adjusting device can be reliably and firmly mounted to the tool body through engagement of the ball and the engaging recess of the tool body.

Another aspect according to the present invention includes adjusting devices that include an adjusting member, an intermediate member, a first lock device and a second lock device. The adjusting member is adapted to be mounted to a tool body of a rotary tool such that the adjusting member can move along an axial direction but cannot rotate about an axis. The operation member is rotatable between a lock position and an unlock position. The intermediate member is rotatably disposed between the adjusting member and the operation member and is threadably engaged with the adjusting member, so that the adjusting member moves along the axial direction as the intermediate member rotates. The first lock device can releasably lock the intermediate member against the tool body. The second lock device can releasably lock the operation member against the intermediate member.

A further aspect of the present invention includes adjusting devices that include a first member, a second member and a lock device. The first member can be movably mounted to a tool body of a rotary tool. The second member is operable by an operator. The lock device can releasably lock the first member against the tool body and can releasably lock the first member against the second member in response to the operation of the second member. A third member may be coupled to the first member, so that the third member can move relative to the tool body in response to the movement of the second member when the first member is unlocked from the tool body but is locked against the second member. In the preferred embodiment, the first member is an intermediate member, the second member is an operation member, and the third member is an adjusting member.

DETAILED DESCRIPTION OF THE INVENTION

Each of the additional features and teachings disclosed above and below may be utilized separately or in conjunction with other features and teachings to provide improved working depth adjusting devices and power tools having such adjusting devices. Representative examples of the present invention, which examples utilize many of these additional features and teachings both separately and in conjunction with one another, will now be described in detail with reference to the attached drawings. This detailed description is merely intended to teach a person of skill in the an further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
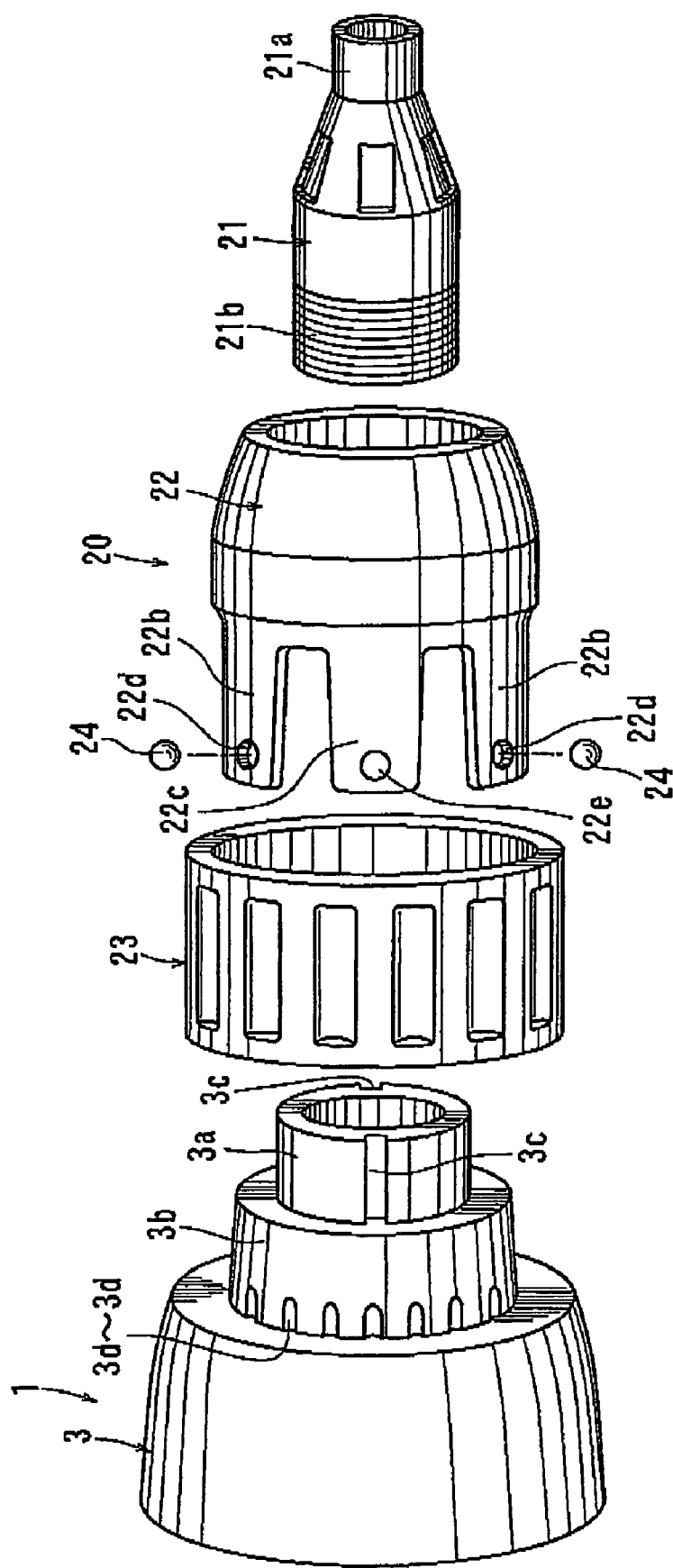
FIG. 1 is an exploded perspective view of a working depth adjusting device according to an embodiment of the present invention.
Figure 2:
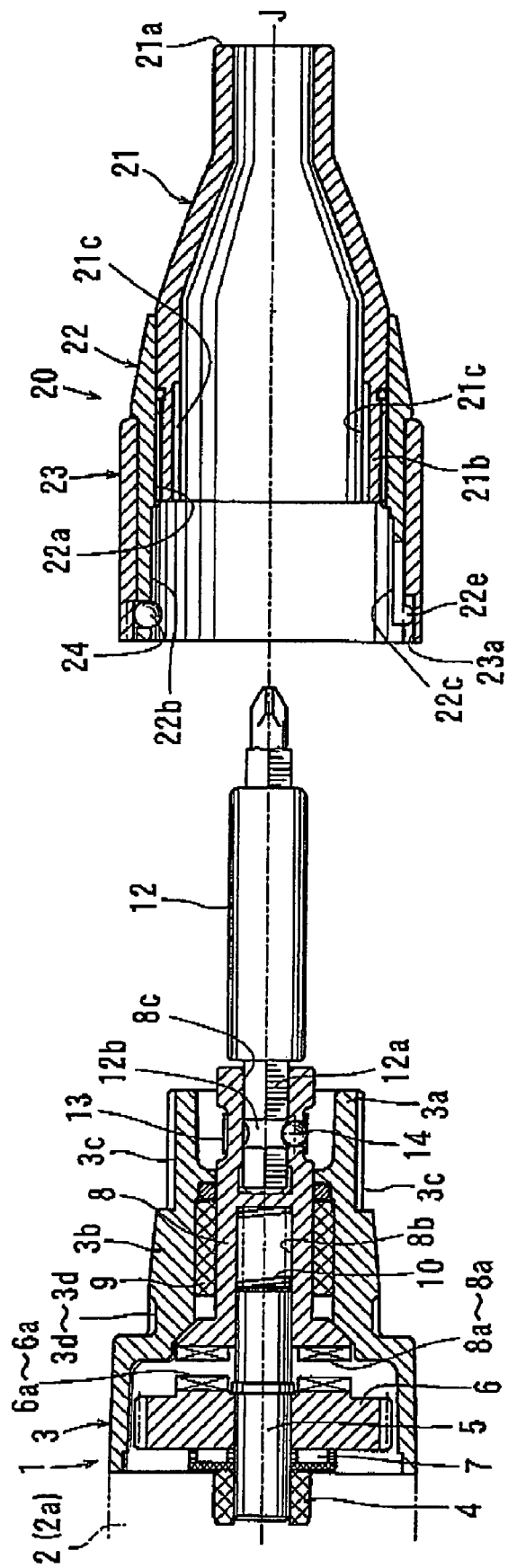
FIG. 2 is a vertical sectional view of the working depth adjusting device and a front portion of a rotary tool and showing the working depth adjusting device removed from the rotary tool.
Figure 3:
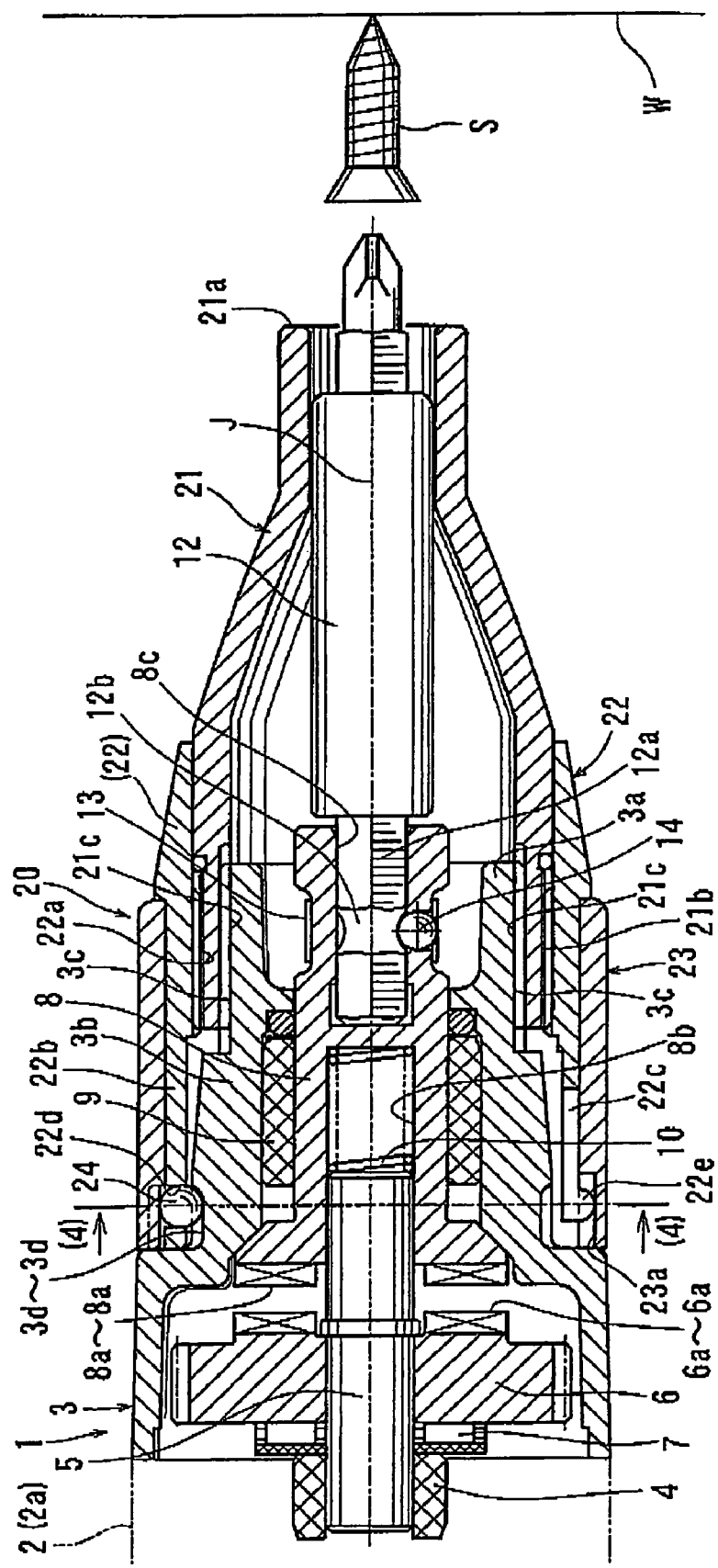
FIG. 3 is a vertical sectional view of the working depth adjusting device and showing the working depth adjusting device in a lock position.

An embodiment according to the present invention will now be described with reference to FIGS. 1 to 8. Referring to FIGS. 1 to 3, a working depth adjusting device 20 of this embodiment is adapted to be mounted to a power screwdriver 1 as an example of a power tool.

A substantially cylindrical tubular gear housing 3 is attached to a body housing 2a of a tool body 2 of the screwdriver 1. A reduction gear mechanism (not shown) is disposed within the gear housing 3 in order to reduce the rotational speed of a motor (not shown) disposed within the tool body 2. As shown in FIG. 3, a drive shaft 5 is rotatably supported within the body housing 2a via a bearing 4. A drive gear 6 (a spur gear in this embodiment) is fixedly attached to die drive shaft 5. The rotation of the motor is transmitted to the drive shaft 5 via the reduction gear mechanism and the drive gear 6.

Drive-side clutch teeth 6a are provided on a front end face (right end face as viewed in FIG. 3) of the drive gear 6. A trust bearing 7 is disposed on the rear side (left side as viewed in FIG. 3) of the drive gear 6 in order to bear against the thrust force that may be applied to the drive gear 6 during the tightening operation of screws.

A front portion of the driver shaft 5 is slidably inserted into a support hole 8b formed in a rear portion of a spindle 8, so that the spindle 8 can rotate about the same axis as the drive shaft 5 and can move relative to the drive shaft 5 in the axial direction. In addition, the spindle 8 is supported by the gear housing 3 via a bearing 9 such that the spindle 8 can rotate about its axis and can move in the axial direction relative to the gear housing 3. Driven-side clutch teeth 8a are provided on the rear end face of the spindle 8. As the spindle 8 retreats or moves leftward as viewed in FIG. 3, the driven-side clutch teeth 8a engage the drive-side clutch teeth 6a, so that the rotation of the driver gear 6 can be transmitted to the spindle 8.

A compression spring 10 is interposed between the front end of the drive shaft 5 and the bottom of the support hole 8b and serves to bias the spindle 8 forward or rightward as viewed in FIG. 3. Therefore, when no load is applied to the spindle 10, the spindle 8 is held in an advanced position shown in FIGS. 2 and 3, where the rear end portion of the spindle 8 axially contact with the corresponding wall portion of the gear housing 3. When the spindle 8 is in the advanced position, the driven-side clutch teeth 8a do not engage the drive-side clutch teeth 6a, so that no rotation is transit to the spindle 8a and the drive shaft 5 rotates idle. As shown in FIG. 3, in order to drive a screw S, with the screw S set to a font end of a drive bit 12 (that will be described later), the entire rotary tool 1 is pressed against a workpiece W, so that the driver bit 12 as well as the spindle 8 moves leftward as viewed in FIG. 3, causing engagement between the driven-side clutch teeth 8a and the drive side clutch teeth 6a for transmitting the rotation of the drive shaft 5 to the spindle 8.

As the screw S is driven into the workpiece W, the entire rotary tool 1 moves toward the workpiece W and a contact portion 21a of a working depth adjusting device 20 (that will be described later) subsequently contacts with the workpiece W. With the contact surface 21a contacted with the workpiece W, the screw S is further driven into the workpiece W by the rotating spindle 8 that moves forwardly relative to the drive shaft 5 with the aid of the compression spring 10 until the driven-side clutch teeth 8a of the spindle 8 is disengaged from the drive-side clutch 6a. The driving operation of the screw S is then completed.

As shown in FIG. 3, the spindle 8 extends forwardly to a position adjacent to the front end of the gear housing 3 with respect to the axial direction. A mount hole 8c is formed in the front portion of the spindle 8 and has the same axis as the spindle 8. The driver bit 12 is inserted into the mount hole 8c and is fixed in position relative to the spindle 8, so that the drive bit 12, the spindle 8 and the drive shaft 5 extend along the same axis (indicated by alphabet "J" in FIG. 3).

A steel ball 14 is radially movably received within a corresponding radial hole formed in the spindle 8 and is biased by a leaf spring 13 in a direction toward the mount hole 8c. The steel ball 14 can engage an annular removal prevention recess 12b formed in a mount shaft portion 12a of the driver bit 12. Therefore, the driver bit 12 can be prevented from being removed from the mount hole 8c even if vibrations are applied daring the driving operation. The mount shaft portion 12a of the driver bit 12 can be easily removed from the mount hole 8c by forcibly withdrawing the mount shaft portion 12a against the engaging force of the resiliently biased steel ball 14. Therefore, the drive bit 12 can be easily changed to another driver bit.

The front portion of the gear housing 3 includes a guide portion 3a and a retainer portion 3b each having a cylindrical tubular configuration and having the same axis as the axis J. The guide portion 3a is positioned on the front side of the retainer portion 3b and has a smaller outer diameter than the outer diameter of the retainer portion 3b. A pair of guide recesses 3c are formed in the outer circumferential surface of the guide portion 3a at positions diametrically opposing to each other. The guide recesses 3c have a predetermined width and extend thought the length of the guide portion 3a in the axial direction. A plurality of engaging recesses 3d are formed in the outer circumferential surface of the retainer portion 3b at regular intervals in the circumferential direction. In this embodiment twelfth engaging recesses 3d are provided. Each of the engaging recesses 3d has a substantially semicircular cross section. The engaging recesses 3d have a width in the circumferential direction of the retainer portion 3b in order to engage steel balls 24 that will be explained later. The engaging recesses 3d have a length in the axial direction of the retainer portion 3b, which is slightly greater than the diameter of the steel balls 24.

The guide portion 3a and the retainer portion 3b are used for mounting the working depth adjusting device 20 to the gear housing 3. The working depth adjusting device 20 generally includes an adjusting member 21, an intermediate member 22 and an operation member 23. The adjusting member 21 is movable along the axis J. The intermediate member 22 is rotatably connected to the adjusting member 21. The operation member 23 is rotatably supported on the intermediate member 22 and is movable between a lock position and an unlock position.

In this embodiment, each of the adjusting member 21, the intermediate member 22 and the operation member 23 has a substantially cylindrical tubular configuration and is molded by resin. The front portion of the adjusting member 21 is configured as the contact portion 21a for contacting with the workpiece W. The rear portion of the adjusting member 21 is configured as a threaded portion 21b with an external thread and a pair of guide projections 21c formed on its inner circumferential surface. The guide projections 21c are elongated in directions parallel to the axis J.

As described previously, as the screwdriver 1 with the screw S set to the driver bit 12 is pressed against the workpiece W, the driver bit 12 and the spindle 8 retreat against the biasing force of the compression spring 10, so that the driven-side clutch teeth 8a of the spindle 8 engage with the drive-side clutch teeth 6a of the drive gear 6. The engagement between the driven-side clutch teeth 8a and the drive-side clutch teeth 6a occurs when the front end of the driver bit 12 has moved to a position that is rearward of the front end of the contact portion 21a. Hence, as the screw S is driven into the workpiece W, the front end of the contact portion 21a contacts with the workpiece W. After the front end of the contact portion 21a has contacted with the workpiece W, the screw S is further driven as the rotating spindle 8 moves forwardly with the aid of the compression spring 10. As the rotating spindle 8 moves forwardly, the engagement between the driven-side clutch teeth 8a and the drive-side clutch teeth 6a becomes shallower and is eventually released. As a result, the drive shaft 5 rotates idle and the driving operation of the screw S is completed.

The driving depth of the screw S into the workpiece W can be adjusted by changing the position of the contact portion 21a of the working depth adjusting device 20 relative to the tool body 2. Thus, if the adjusting member 21 is moved rightward relative to the tool body 2, the tightening depth of the screw S decreases. On the contrary, if the adjusting member 21 is moved leftward relative to the tool body 2, the tightening depth of the screw S increases. For example, the adjusting member 21 can be adjusted such that the front end of the driver bit 12 is aligned with the front end of the contact portion 21a of the adjusting member 21 when the driven-side clutch teeth 8a is disengaged from the drive-side clutch teeth as a result of movement of the driver bit 12 in a tightening direction (rightward as viewed in FIG. 3) of the screw S during the driving operation of the screw S. This adjustment enables the screw S to be driven into the workpiece W by such a depth that the head of the screw S is positioned to be substantially flush with the surface of the workpiece W.

As shown in FIG. 3, in the assembled state of the working depth adjusting device 20 to the tool body 2, the rear portion of the adjusting member 21 receives the guide portion 3a of the gear housing 3 and the guide projections 21c of the adjusting member 21 respectively slidably engage the guide recesses 3c of the guide portion 3a without substantial clearance between each guide projection 21c and wall surfaces of the corresponding guide recess 3c facing thereto. Therefore, the adjusting member 21 is prevented from rotating relative to the gear housing 3 but is slidably movable in the direction of the axis J relative to the gear housing 3.

On the other hand, the rear portion of the adjusting member 21 is received within the front portion of the intermediate member 22. An internal threaded portion 22b is formed on the inner circumferential surface of the front portion of the intermediate member 22 and engages the thread portion 21b formed on the rear portion of the adjusting member 21. Therefore, as the intermediate member 22 is rotated relative to the gear housing 3, the adjusting member 21 moves relative to the gear housing 3 along the axis J of the spindle 8 due to engagement between the internal threaded portion 22b and the thread portion 21b, because the adjusting member 21 is prevented from rotating relative to the gear housing 3.

Figure 4:
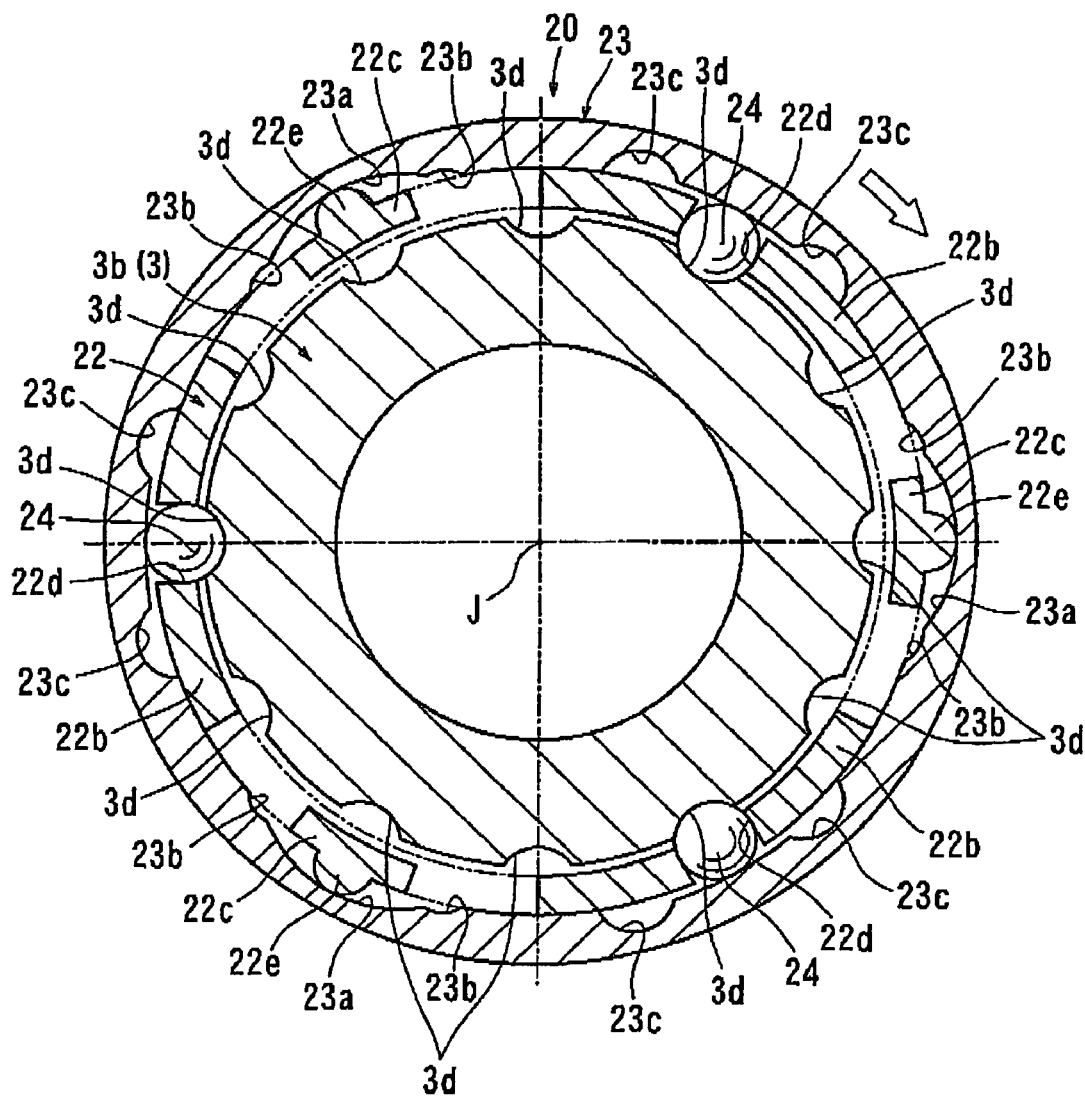
FIG. 4 is a cross sectional view taken along line (4)-(4) in FIG. 3.
Figure 5:
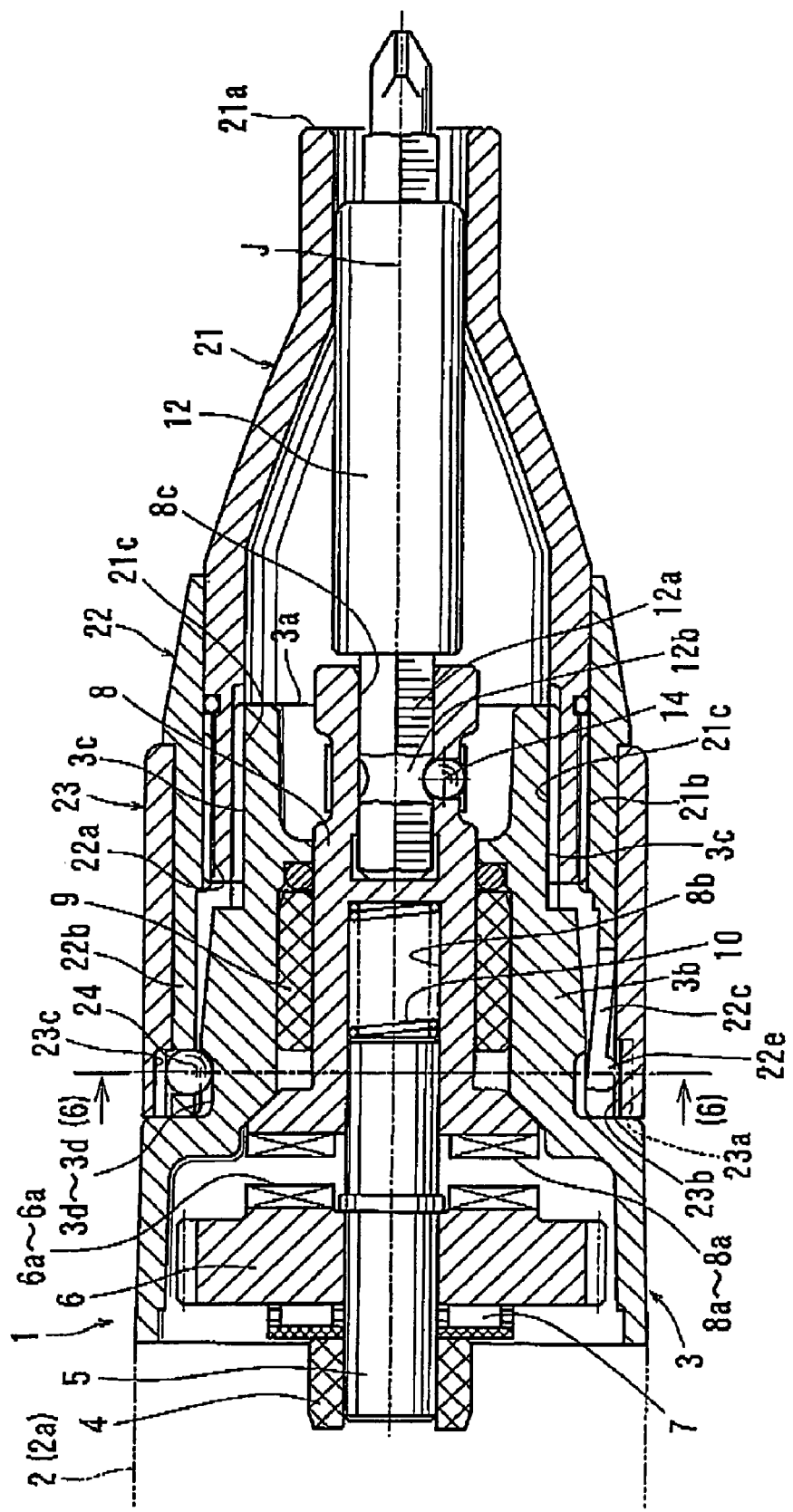
FIG. 5 is a vertical sectional view similar to FIG. 3 but showing the working depth adjusting device in an unlock position, where relief recesses are positioned on the radially outer side of steel balls and second engaging arms are displaced radially inner side.

Three first engaging arms 22b and three second engaging arms 22c extend rearward from the rear portion of the intermediate member 22 and are arranged alternately in the circumferential direction. As shown in FIG. 4, the three first engaging arms 22b are spaced equally from each other in the circumferential direction. Also, the three second engaging arms 22c are spaced equally from each other in the circumferential direction. Further, each of the second engaging arms 22c is spaced equally from the two adjacent first engaging arms 22b. A retaining hole 22d is formed in the rear end portion of each of the first engaging arms 22b in order to retain the steel ball 24 in such a manner that the steel ball 24 can move within the retaining hole 22d in the radial direction as viewed in FIG. 4 (in the direction of thickness of the first engaging arm 22b). The radially inner-side diameter of the retaining hole 22d is set to be slightly smaller than the diameter of the steel ball 24. Therefore, the steel ball 24 is prevented from being removed in the direction radially inward from the retaining hole 22d.

As shown in FIGS. 3 and 4, in the assembled state, the first and second engaging arms 22b and 22c enter a clearance provided between the retainer portion 3b of the gear housing 3 and the operation member 23. In the state shown in FIG. 4, all three steel balls 24 retained at the rear ends of the three first engaging arms 22b are in engagement with three of the engaging recesses 3d formed in the retainer portion 3b of the gear housing 3.

In the state shown in FIGS. 3 and 4, the operation member 23 is positioned at the lock position, so that each of the steel balls 24 is prevented from moving radially outward by the inner circumferential surface of the operation member 23. Therefore, in this state, the working depth adjusting device 20 is fixed in position relative to the gear housing 3.

The thickness of the second engaging arms 22c is set to be smaller than the thickness of the first engaging arms 22b, so that the second engaging arms 22c can resiliently deform in the direction of thickness or in the radial direction with respect to the intermediate member 22. Therefore, in the assembled state, the second engaging arms 22c are permitted to resiliently deform in the radial direction within a range of the clearance provided between the retainer portion 3b and the operation member 23.

A hemispherical engaging projection 22e protrudes radially outward from the rear end of each of the three second engaging arms 22c and engages corresponding one of three cam recesses 23a formed in the inner circumferential surface of the operation member 23 and space equally from each other in the circumferential direction. Each of the cam recesses 23a has a depth in the radial direction, which continuously varies in the circumferential direction. More specifically, the depth of each of the cam recesses 23a is the largest at the central portion with respect to the circumferential direction and becomes shallower in directions away from the central portion. Therefore, when the engaging projection 22e is positioned at the central portion of the cam recess 23a, the rear portion of the second engaging arm 22c is held at the most radially outwardly displaced position due to its resiliency (see FIGS. 3 and 4). As the operation member 23 is rotated in a clockwise direction as indicated by an outline arrow in FIG. 4 or in a counterclockwise direction, the engaging projection 22e of the second engaging arm 22c moves to a position having a shallower depth of the cam recess 23a, so that the rear portion of the second engaging arm 22c is resiliently deformed to be displaced radially inward.

Figure 6:
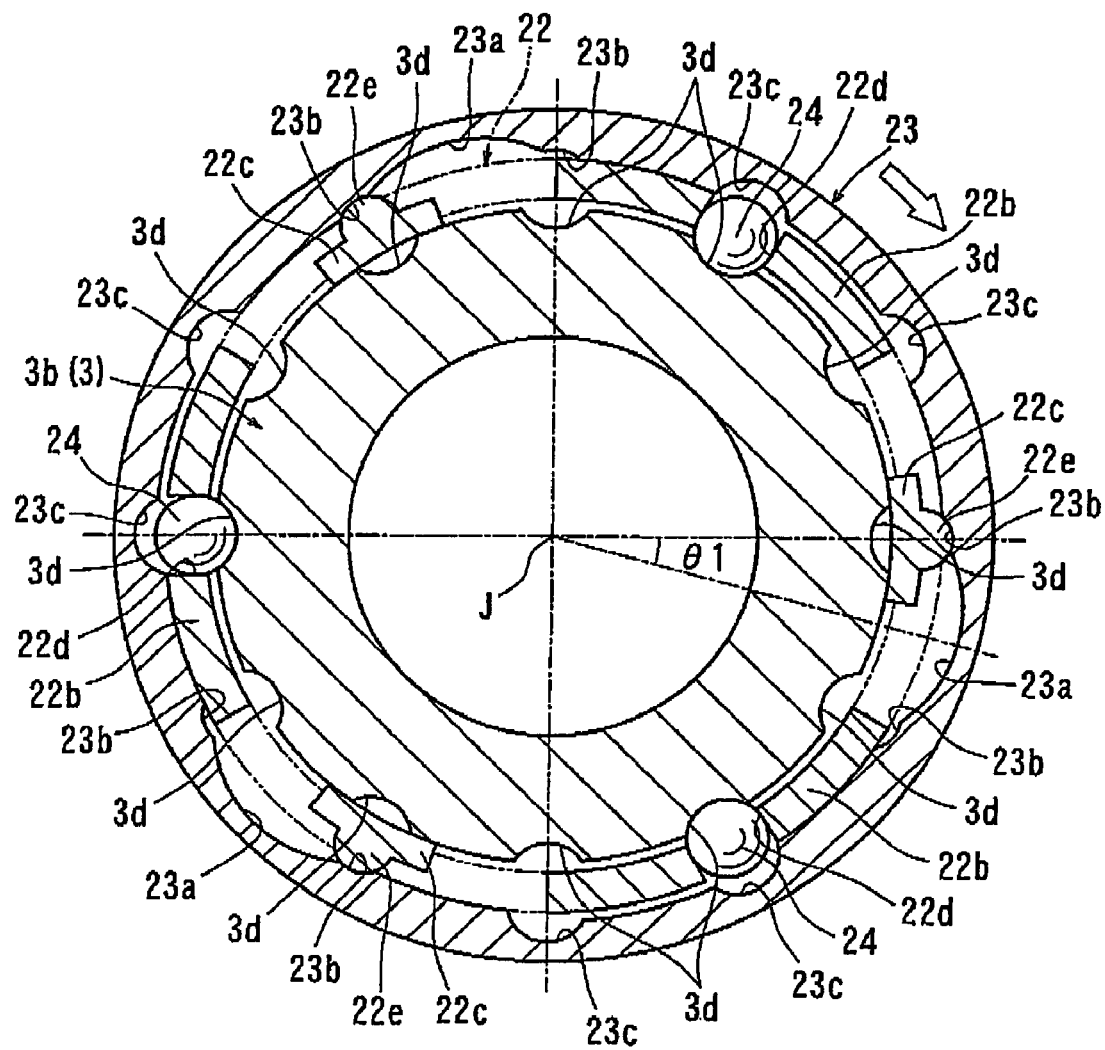
FIG. 6 is a cross sectional view taken along line (6)-(6) in FIG. 5 and showing an operation member rotated by an angle of θ1 in the clockwise direction relative to an intermediate member and a retainer portion of a gear housing from the position shown in FIG. 4.
Figure 7:
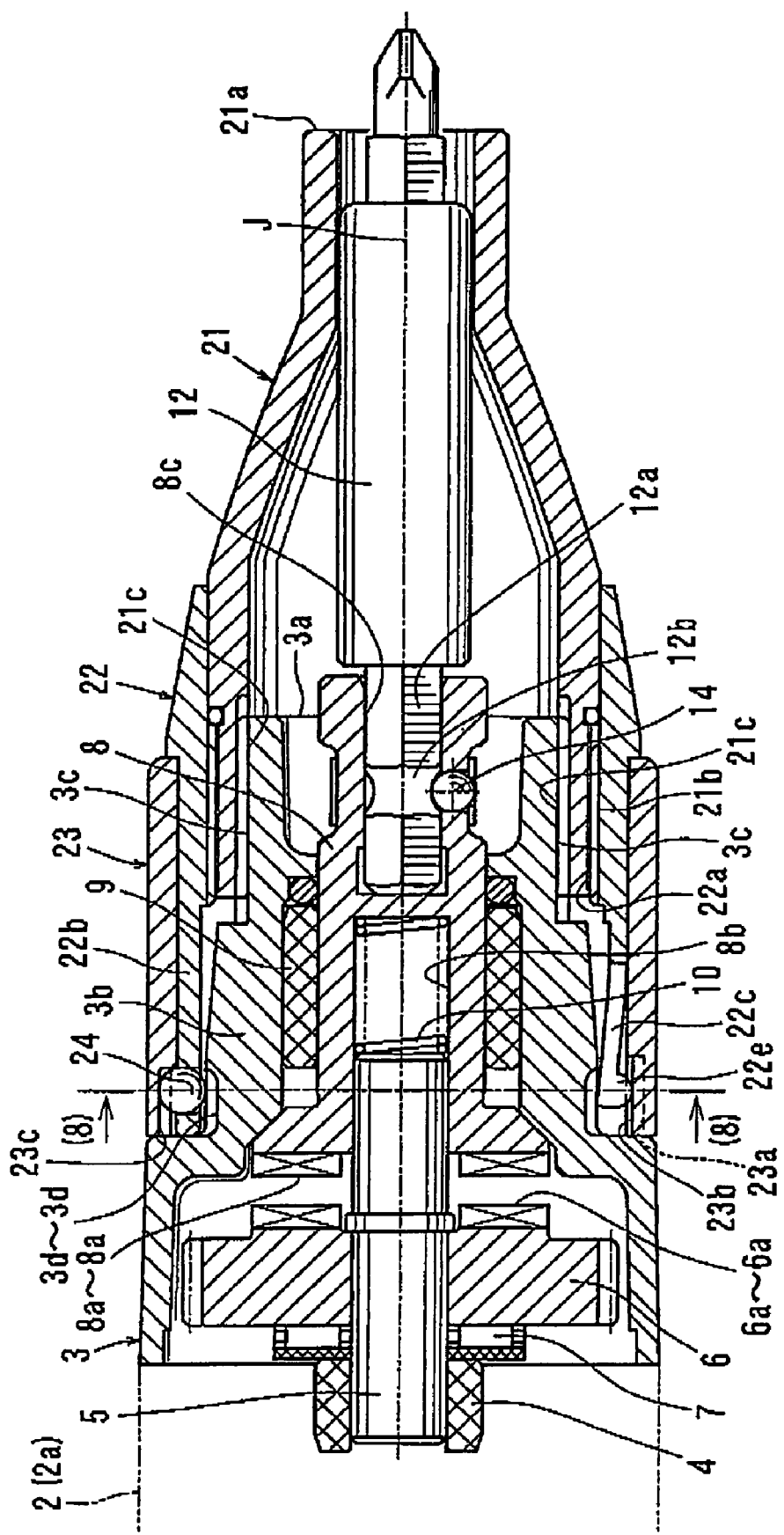
FIG. 7 is a vertical sectional view similar to FIG. 5 but showing the state where an adjusting member can be moved to advance or retreat by the rotation of the intermediate member that is rotated together with the operation member, and the steel balls 24 are moved into relief recesses and are removed from engaging recesses of the gear housing.

A pair of position retaining recesses 23b are formed in the inner circumferential surface of the gear housing 3 in continuity with opposite ends in the circumferential direction of each of the cam recesses 23a. When the operation member 23 has rotated in the clockwise direction as shown in FIG. 6 by an angle of θ1 from the position shown in FIG. 4, the engaging projection 22e of each second engaging arm 22c engages one of the position retaining recess 23b positioned in the counterclockwise direction as viewed in FIG. 4 of the corresponding cam recess 23a. On the other hand, when the operation member 23 has rotated in the counterclockwise direction by an angle of θ1 from the position shown in FIG. 4, the engaging projection 22e of each second engaging arm 22c engages the other of the position retaining recesses 23b positioned in the clockwise direction as viewed in FIG. 4 of the corresponding cam recess 23a. With the engaging projection 22e of each second engaging arm 22c engaged with either of the position retaining recesses 23b, the operation member 23 is integrated with the intermediate member 22 with respect to rotation. In other words, the operation member 23 is prevented from rotating relative to the intermediate member 22.

In addition to the cam recesses 23a, six relief recesses 23c are formed in the inner circumferential surface of the operation member 23. More specifically, two relief recesses 23c are positioned between two adjacent cam recesses 23a in the circumferential direction so as to radially oppose to the corresponding first engaging arm 22b of the intermediate member 22 as shown in FIG. 4. In the state shown in FIG. 4, each steel ball 24 does not engage any of the corresponding two relief recesses 23c but is positioned between the two relief recesses 23c with respect to the circumferential direction. Therefore, each steel ball 24 is held to engage the corresponding engaging recess 3d of the gear housing 3 and is prevented from being removed from the engaging recess 3d. Hence, the intermediate member 22 is reliably fixed in position in the circumferential direction relative to the gear housing 3 without causing rotational movement due to vibrations or like external forces.

When the operation member 23 has been rotated by the angle of θ1, the engaging projection 22e of each of the second engaging arms 22c engages one of the position retaining recesses 23b at opposite ends of the corresponding cam recess 23c as described previously. At the same die, each steel ball 24 is positioned to radially oppose to one of the corresponding two relief recesses 23c as shown in FIG. 6. Therefore, each steel ball 24 is allowed to move radially outward into the relief recess 23c so as to be disengaged from the corresponding engaging recess 3d of the gear housing 3. With the steel balls 24 thus disengaged from the corresponding engaging recesses 3d, the intermediate member 22 can be removed from the retainer portion 3b of the gear housing 3 as shown in FIG. 2.

In this way, by rotating the operation member 23 by the angle of θ1 from the position shown in FIG. 4, the operation member 23 can be locked with respect to rotation against the intermediate member 22 due to engagement of the engaging projections 22e of the second engaging arms 22c with the position retaining recesses 23b of the operation member 23. At the same time, the intermediate member 22 is permitted to rotate about the axis J relative to the retainer portion 3b of the gear housing 3 because the steel balls 24 can move in the radial direction for disengaging from the engaging recesses 3d.

Figure 8:
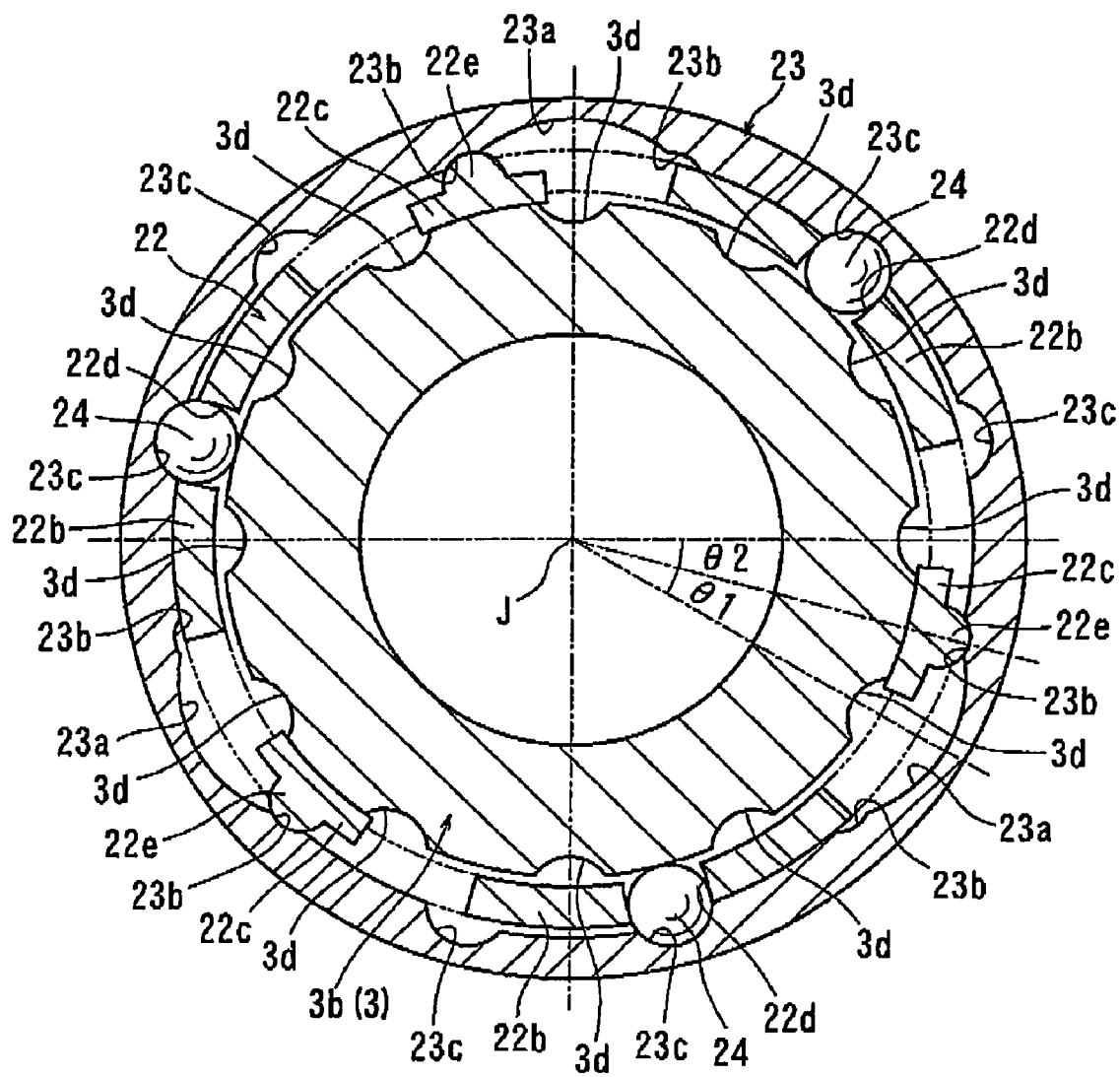
FIG. 8 is a cross sectional view taken along line (8)-(8) in FIG. 7 and showing the operation member rotated further by an angle of θ2 in the clockwise direction together with the intermediate member relative to the retainer portion of the gear housing from the position shown in FIG. 6.

As the operation member 23 is further rotated by an angle of θ2 from the position shown in FIG. 6, the intermediate member 22 rotates together with the operation member 23 by the same angle of θ2 as shown in FIG. 8. Thus, in the state shown in FIG. 8, the operation member 23 has rotated by an angle of the sum of θ1 and θ2 from the position shown in FIG. 4 and the intermediate member 22 has rotated by the angle of θ2 from the position shown in FIG. 4.

As the intermediate member 22 rotates relative to the gear housing 3, the adjusting member 21 moves along the axis J relative to the gear housing 3, because the threaded portion 22a of the intermediate member is in engagement with the threaded portion 21b of the adjusting member 21, while the rotation of the adjusting member 21 relative to the gear housing 3 is prevented by the engagement between the guide projections 21c of the adjusting member 21 and the guide recesses 3c of the guide portion 3a of the gear housing 3.

Because the adjusting member 21 moves along the axis J, the position of the contact portion 21a of the adjusting member 21 relative to the driver bit 12 changes. Therefore, it is possible to change the driving depth of the screw S into the workpiece W.

In this embodiment, the threaded portion 22a of the intermediate member and the threaded portion 21b of the adjusting member 21 are formed as right-hand threads. Therefore, As the operation member 23 is rotated in the clockwise direction (as indicated by the outline arrow in FIG. 4), the adjusting member 21 retreats into the intermediate member 22 or moves leftward as viewed in FIG. 3. In this case, the driving depth of the screw S is increased.

On the contrary, as the operation member 23 is rotated by the angle of θ1 in the counterclockwise direction (in the direction opposite to the direction indicated by the outline arrow in FIG. 4) from the position shown in FIG. 4, each of the engaging projections 22e of the second engaging arms 22c engages the other of the position retaining recesses 23b at opposite ends of the corresponding cam recess 23c, i.e., the position retaining recess 23b that is positioned on the opposite side of the position retaining recess 23b, with which the engaging projection 22e engages as shown in FIG. 6 in the case that the operation member 23 is rotated in the clockwise direction.

In this way, in either case that the operation member 23 is rotated in the clockwise direction or the counterclockwise direction from a lock position where each of the engaging projections 22e is positioned centrally between the position retaining recesses 23b of the corresponding cam recess 23a, each engaging projection 22e can engage either one of the position retaining recesses 23b, enabling rotation of the intermediate member 22 together with the operation member 23.

Also, in the case that the operation member 23 has rotated by the angle of θ1 in the counterclockwise direction, each of the steel balls 24 is positioned to radially oppose to any one of the relief recesses 23c of the operation member 23 and is enabled to be disengaged from the corresponding engaging recess 3d of the gear housing 3. Therefore, it is possible to remove the intermediate member 22 from the gear housing 3 by withdrawing the intermediate member 22 in the direction along the axis J. In addition, by further rotating the operation member 23 over the angle of θ1 in the counterclockwise direction, it is possible to rotate the intermediate member 22 in order to axially move the adjusting member 21 relative to the gear housing 3. In this case, the adjusting member 21 moves rightward as viewed in FIG. 3, so that the driving depth of the screw S can be decreased.

As described above, according to this embodiment, the working depth adjusting device 20 can be removed from the gear housing 3 by rotating the operation member 23 from a lock position to an unlock position by the angle of θ1, which is a relatively small angle, in either the clockwise direction or the counterclockwise direction for enabling the steel balls 24 to be removed from the engaging recesses 3d.

In order to mount the working depth adjusting device 20 to the gear housing 3, the operator positions the operation member 23 at the unlock position relative to the intermediate member 22, so that the engaging projections 22e engage the position retaining recesses 23b. Thereafter, the guide portion 3a and the retaining portion 3b of the gear housing 3 are inserted into the working depth adjusting device 20. Subsequently, the operation member 23 is rotated from the unlock position toward the lock position. At the initial stage of rotation, the intermediate member 22 rotates together with the operation member 23 due to engagement between the engaging projections 22e and the position retaining recesses 23b. As the intermediate member 22 further rotates, the steel balls 24 engage the engaging recesses 3d of the gear housing 3 so as to be disengaged from the relief recesses 23c. Therefore, further rotation of the operation member 23 results disengagement between the engaging projections 22e and the position retaining recesses 23, because the intermediate member 22 is held in position relative to the gear housing 3 due to engagement of the steel balls 24 with the engaging recesses 3d. When the engaging projections 22e have moved to the central positions of the cam recesses 23a, the steel balls 24 are held to engage with the engaging recesses 3d of the gear housing 3 so as not to move in the radial direction (see FIG. 4). The mounting operation of the intermediate member 22 and eventually the entire working depth adjusting device 20 can be thus mounted to the gear housing 3.

Because the working depth adjusting device 20 can be removed from the gear housing 3 or can be mounted to the gear housing 3 by rotating the operation member 23 by the angle of θ1 that is a relatively small angle, it is possible to easily and rapidly perform the removing operation or the mounting operation of the working depth adjusting device 20 without need of rotating the operation member 23 by a large angle or by several times.

In addition, the operation member 23 is reliably locked by the engagement of three steel balls 24 with the engaging recesses 3d of the gear housing 3 without substantial clearances between the steel balls and the inner walls of the engaging recesses 3d. Because the steel balls 24 are prevented from moving in the radial direction by the opposing wall surface of the operation member 23, the steel balls 24 are further reliably held in position. Therefore, the working depth adjusting device 20 can be firmly mounted to the tool body 2 in comparison with the conventional mounting construction that utilizes the resiliency of the engaging claws.

Further, the driving depth of the screw S can be easily adjusted by rotating the operation member 23 from the lock position shown in FIG. 4 toward the unlock position. Thus, as the operation member 23 is rotated over the angle of $\theta 1$, the intermediate member 22 rotates relative to the adjusting member 21 together with the operation member 23, so that the adjusting member 21 moves along the axis J.

The above embodiment can be modified in various ways. For example, the steel balls 24 may be replaced with engaging projections that extend radially inward from the rear ends of the first engaging arms 22b and are engageable with corresponding engaging recesses formed in the gear housing 3. In this connection, the first engaging arms 22b may be configured to resiliently deform in order to enable movement of the engaging projections in the radial direction. When in the lock position, the engaging projections of the first engaging arms 22b closely engage the engaging recesses of the gear housing 3, while the inner circumferential surface of the operation member 23 prevents the engaging projections of the first engaging arms from moving in the radially outward direction. Also with this arrangement, the working depth adjusting device 20 can be firmly mounted to the tool body 2, because no substantial movement of the engaging projections of the first engaging arms 22b occurs even in the event that external force has been applied to the adjusting device 20.

Further, although the above embodiment has been described in connection with the power screwdriver 1, the working depth adjusting device 20 can be applied to a power drill to which a drill bit is attached and rotated for drilling a workpiece.

Furthermore, although the position retaining recesses 23b are provided on opposite ends of each cam recess 23a, the position retaining recesses 23b may be eliminated. Thus, the intermediate member 22 may be locked against the operation member 23 when the second engaging arms 22c are wedged at their engaging projections 22e between the operation member 23 and the retaining portion 3b of the gear housing 3.

Furthermore, three first engaging arms 22b and three second engaging arms 22c are arranged alternately at equal intervals in the circumferential direction, the number of the first engaging arms 22b and the number of the second engaging arms 22c can be selectively determined. In addition, the positions of the first engaging arms 22b and the second engaging arms 22c can be arbitrarily determined. In response to change of the number and the positions of the first engaging arms 22b and the second engaging arms 22c, the number and the positions of the steel balls 24 (or engaging projections) and the cam recesses 23a may be changed.

The invention claims:

1. A working depth adjusting device for a rotary tool having a tool body and a spindle rotatable about an axis, wherein a tool bit can be attached to the spindle so as to be rotatably driven, and the rotating tool bit can be pressed against a workpiece for processing the workpiece, the working depth adjusting device comprising:

an adjusting member constructed to be attached to the front portion of the tool body and movable along the axis of the spindle, so that the position of the adjusting member can be adjusted relative to the tool bit with respect to a working depth direction; an intermediate member rotatably mounted to the adjusting member, wherein the adjusting member can move in the working depth direction as the intermediate member rotates; and an operation member operable to rotate relative to the intermediate member between a lock position and an unlock position;

wherein the intermediate member has a first engaging member;

wherein when the operation member is rotated to the lock position, the first engaging member engages the tool body, and the engagement of the first engaging member is maintained by the operation member, so that the working depth adjusting device can be prevented from being removed from the tool body; and wherein when the operation member is rotated to the unlock position, the first engaging member is disengaged from the tool body, so that the working depth adjusting device can be removed from the tool body.

2. The working depth adjusting device as in claim 1, wherein the first engaging member is engageable with the tool body in a diametrical direction with respect to a rotational axis of the intermediate member;

wherein the intermediate member further includes a second engaging member engageable with and disengageable from the operation member in response to movement in a rotational direction of the operation member;

wherein when the operation member is rotated to the lock position, the second engaging member is disengaged from the operation member to permit rotation of the operation member relative to the intermediate member, and the first engaging member engages the tool body, and the engagement of the first engaging member is locked by the operation member; and wherein when the operation member is rotated to the unlock position, the operation member and the intermediate member are brought to rotate together by the second engaging member, and the first engaging member can be disengaged from the tool body to permit rotation and the movement in a removing direction of the intermediate member relative to the tool body.

3. The working depth adjusting device as in claim 2, wherein the first engaging member comprises a ball; and wherein the tool body has an engaging recess for engaging the ball;

wherein when the operation member is rotated to the lock position, the ball engages the engaging recess of the tool body and is held in position; and wherein when the operation member is rotated to the unlock position, the ball is permitted to be removed from the engaging recess.

4. The working depth adjusting device as in claim 2, wherein the working depth adjusting device comprises a plurality of first engaging members and a plurality of second engaging members arranged in the rotational direction.

5. The working depth adjusting device as in claim 4, wherein the plurality of first engaging members and the plurality of second engaging members are arranged alternately in the rotational direction.

6. An adjusting device for a rotary tool having a tool body, comprising:

an adjusting member constructed to be mounted to the tool body such that the adjusting member can move along an axial direction but cannot rotate about an axis;

an operation member rotatable between a first position and a second position; and an intermediate member rotatably disposed between the adjusting member and the operation member and threadably engaged with the adjusting member, so that the adjusting member moves along the axial direction as the intermediate member rotates;

a first lock device constructed to releasably lock the intermediate member against the tool body; and a second lock device constructed to releasably lock the operation member against the intermediate member.

7. The adjusting device as in claim 6, wherein the first lock device is constructed to lock the intermediate member against the tool body when the second lock device unlocks the operation member from the intermediate member; and wherein the first lock device is construed to unlock the intermediate member from the tool body when the second lock device locks the operation member against the intermediate member.

8. The adjusting device as in claim 6, wherein the first lock device comprises:

an engaging member movable together with the intermediate member in a rotational direction;

an engaging recess formed in the tool body and engageable with the engaging member; and a holder constructed to hold the engaging member in engagement with the engaging recess.

9. The adjusting device as in claim 8, wherein the engaging recess is formed in a radially outer surface of the tool body;

wherein the bolder comprises a wall portion of a radially inner wall of the operation member;

wherein when the operation member is in the first position, the wall portion radially opposes to the engaging recess, so that the engaging member can be prevented from being removed from the engaging recess.

10. The adjusting device as in claim 9, wherein the first lock device further comprises a relief recess formed in the radially inner wall of the operation member;

wherein when the operation member is in the second position, the relief recess radially opposes to the engaging recess, so that the engaging member can be moved from the engaging recess into the relief recess, enabling rotation of the intermediate member relative to the tool body.

11. The adjusting device as in claim 9, wherein the engaging member comprises a ball radially movably disposed within the intermediate member.

12. The adjusting device as in claim 10, wherein the first lock device comprises a plurality of engaging recesses, a plurality of wall portions, and a plurality of relief recesses arranged in the rotational direction of the operation member.

13. The adjusting device as in claim 6, wherein the second lock device comprises a projection formed on a radially outer surface of the intermediate member, and a position retaining recess formed in a radially inner wall of the operation member;

wherein the projection can removably engage the position retaining recess when the operation member is in the second position.

14. The adjusting device as in claim 13, wherein the second lock device further includes a cam recess formed in the operation member in continuity with the position retaining recess in the rotational direction;

wherein the projection engages the cam recess such that the projection can move in the rotational direction relative to the cam recess when the operation member is in the first position.

15. The adjusting device as in claim 14, wherein the second lock device comprises a plurality of projections, a plurality of position retaining recesses, and a plurality of cam recesses respectively formed in continuity with the position retaining recesses in the rotational direction of the operation member.

16. The adjusting device as in claim 14, wherein two position retaining recesses are positioned at opposite ends of each cam recess in the rotational direction.

17. The adjusting device as in claim 6, wherein each of the adjusting member, the operation member and the intermediate member has a substantially cylindrical tubular configuration and the adjusting member, the operation member and the intermediate member are disposed coaxially with each other.

18. A rotary tool comprising the working depth adjusting device as in claim 1.

19. The rotary tool as in claim 18, wherein the rotary tool is a power screwdriver, so that the tool bit is pressed against the workpiece, while a screw is engaged by the tool bit and positioned between the tool bit and the workpiece, when the screw is driven into the workpiece by the screwdriver.

20. A rotary tool comprising the adjusting device as in claim 6 and further comprising:

a spindle having a rotational axis and axially non-movably disposed within the tool body a tool bit attached to a front portion of the spindle and extending along the same axis as the spindle;

wherein the rotational axis of the adjusting member is parallel to the axis of the tool bit, so that the position of the adjusting member can be adjusted with respect to the axial direction relative to the tool bit.

21. An adjusting device for a rotary tool having a tool body, comprising: a first member constructed to be movably mounted to the tool body; a second member operable by an operator; and a lock device operable in response to the operation of the second member; wherein the lock device is connected to directly and releasably lock the first member against the tool body and to releasably lock the first member against the second member.

22. The adjusting device as in claim 21, further comprising a third member coupled to the first member, so that the third member can move relative to the tool body in response to the operation of the second member when the first member is unlocked from the tool body while the first member is locked against the second member.

* * * * *